United States Patent Office 3,337,408
Patented Aug. 22, 1967

3,337,408
METHOD OF EFFECTING ANALGESIA
David A. McClure, Canoga Park, Calif., assignor to Rexall Drug and Chemical Company, Los Angeles, Calif., a corporation of Delaware
No Drawing. Filed June 24, 1966, Ser. No. 560,070
5 Claims. (Cl. 167—65)

This application is a continuation-in-part of my copending application Ser. No. 470,931, filed July 9, 1965, now abandoned, entitled, "Analgesic Composition and Method of Effecting Analgesia."

This invention relates to a composition of matter having analgesic activity and to a method of effecting analgesia in mammals.

The invention sought to be patented, in a first product composition aspect, resides in the concept of a composition of matter comprising phenacetin and 4-dimethylaminomethyl-2-methyl-1,3-dioxolane, or one of its hereinafter described equivalents.

The invention sought to be patented, in a second product composition aspect, resides in the concept of a composition of matter comprising N-methyl-4-phenyl-4-carbethoxypiperidine, or its hereinafter described equivalents, and 4-dimethylaminomethyl - 2 - methyl-1,3-dioxolane, or one of its hereinafter described equivalents.

The invention sought to be patented, in its process of use aspect, resides in the concept of a method of effecting analgesia in mammals, including humans, which comprises the administration of a non-toxic amount of 4-dimethylaminomethyl-2-methyl - 1,3 - dioxolane, or one of its hereinafter described equivalents, to a mammal sufficient to induce a state of analgesia therein.

As used throughout this application the terms "lower alkyl" and "lower alkoxy" embrace both straight and branched chain alkyl and alkoxy radicals, respectively, containing from 1 to 6 carbon atoms, for example, but without limitation thereto, methyl, ethyl, n-propyl, isopropyl, n-butyl, tert-butyl, n-amyl, sec-amyl, n-hexyl, 2-ethylbutyl, 2,3-dimethyl butyl and the like in the case of "lower alkyl" and methoxy, ethoxy, n-propoxy, isopropoxy, n-butoxy, tert-butoxy, n-amyloxy, sec-amyloxy, n-hexyloxy, 2-ethylbutoxy, 2,3-dimethylbutoxy and the like in the case of "lower alkoxy" and the term "halo" embraces fluoro, chloro, bromo and iodo.

The compositions of matter constituting the first and second product composition aspect of this invention possess the inherent applied use characteristics of having significant pharmacological activity without adverse toxicity as an analgesic agent as determined by recognized and accepted pharmacological test procedures.

The manner and process of making and using the invention will now be generally described so as to enable one skilled in the art to make and use the same as follows:

The preparation of the 4-dimethylaminomethyl-2-methyl-1,3-dioxolane, referred to hereinabove, and other 4-di-lower alkylaminomethyl-2-lower alkyl-1,3-dioxolanes of the formula

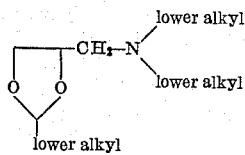

is described in U.S. Patent 2,445,393 to Fourneau who treats an appropriate 4-halomethyl-2-lower alkyl-1,3-dioxolane (such as described by Willfang, Ber. 74 (1941) 150) with a di-lower alkylamine.

1,3-dioxolanes in which the 2-position bears two lower alkyl radicals or one or two phenyl radicals either unsubstituted or bearing one or more lower alkyl, lower alkoxy or halo substituents and/or in which the 4-position bears a substituent of the formula —CH$_2$—NRR in which NRR is a heterocyclic radical such as piperidino, pyrrolidino, morpholino, piperazino, thiomorpholino and the like are the full equivalents of the 4-dimethylamino-2-methyl-1,3-dioxolane in the first and second product composition aspects and process of use aspect of this invention and are prepared by treatment of a 4-chloromethyl-1,3-dioxolane having the desired 2-position substitution with a secondary amine (a di-lower alkylamine or a heterocyclic amine of the formula HNRR where —NRR is as above described).

The dioxolane substances of this invention wherein the dioxolane nucleus bears at the 2-position a single substituent or two different substituents, such as, for example, methyl and propyl, exist as a pair of cis-trans isomers, each of which is in turn a racemic mixture of optical isomers. The 4-di-lower alkylaminomethyl-2-lower alkyl-1,3-dioxolanes prepared as described in the above-mentioned Fourneau patent are, therefore, isomeric mixtures that may be designated as cis-trans-D,L-4-lower alkylaminomethyl - 2 - lower alkyl-1,3-dioxolanes. These isomeric mixtures may be resolved into their pure isomeric forms, for example the specific cis-trans-D,L-4-dimethylaminomethyl-2-methyl-1,3-dioxolane mixture may be resolved into the following pure isomers:

cis-D-4-dimethylaminomethyl-2-methyl-1,3-dioxolane
cis-L-4-dimethylaminomethyl-2-methyl-1,3-dioxolane
trans-D-4-dimethylaminomethyl-2-methyl-1,3-dioxolane
trans-L-4-dimethylaminomethyl-2-methyl-1,3-dioxolane Synthetic sequences are available which will provide the pure isomers delineated above as well as mixtures thereof such as cis-D,L-, trans-D,L-, cis-trans-D-, cis-trans-L- and, cis-trans-D,L-. In one such synthetic sequence. D-, L-, or DL-mannitol, which is a commerically available starting material, is treated with acetone in the presence of zinc chloride to form the corresponding D-, L-, or DL-isomer of 1,2,5,6-diisopropylidene mannitol which is then treated with lead tetra-acetate in the presence of sodium borohydride to give the corresponding L-, D-, or LD-isomer of isopropylidene glycerol. This latter compound is then treated with p-toluene sulfonyl chloride to form the L-, D-, or LD-isopropylidene glycerol tosylate. The tosylate is in turn treated with acetaldehyde to form the L-, D- or LD-4-hydroxymethyl-2-methyl-1,3-dioxolane which is obtained as a mixture of the cis- and trans-stereoisomers. Finally, treatment with dimethylamine yields the cis-trans-D-, cis-trans-L-, or cis-trans - DL - 4 - dimethylaminomethyl - 2 - methyl - 1,3-dioxolane. The cis- and trans-isomers are separated by distillation, the low-boiling fraction being designated as the cis-isomer. The isomers and mixtures thereof thus obtained are:

(A) cis-trans-D(+)-4-dimethylaminomethyl-2-methyl-1, 3-dioxolane, B.P. 150°–165° C., $[\alpha]_D^{23.4°\,C.} = +33.3$
(B) cis-D(+)-4-dimethylaminomethyl - 2 - methyl-1,3-dioxolane, B.P. 157° C., $[\alpha]_D^{24°\,C.} = +42.8$
(C) trans-D-(—)-4-dimethylaminomethyl - 2-methyl-1,3-dioxolane, B.P. 161° C., $[\alpha]_D^{24°\,C.} = +23.7$
(D) cis-trans-L(—)-4-dimethylaminomethyl-2 - methyl-1,3-dioxolane, B.P. 150°–165° C., $[\alpha]_D^{24°C.} = -35$
(E) cis-L(—)-4-dimethylaminomethyl-2-methyl-1,3 - dioxolane, B.P. 158.5° C., $[\alpha]_D^{23.7°C.} = -43.1$
(F) trans-L(—)-4-dimethylaminomethyl-2-methyl - 1,3-dioxolane, B.P. 160°–162.5° C., $[\alpha]_D^{23.8°\,C.} = -24.2$
(G) cis - trans - D(+), L(—)-4-dimethylaminomethyl-2-methyl-1,3-dioxolane, B.P. 160°–163° C.

(H) cis - D(+), L(−) - 4 - dimethylaminomethyl - 2-methyl-1,3-dioxolane, B.P. 158°–160° C.

(I) trans - D(+), L(−) - 4 - dimethylaminomethyl - 2-methyl-1,3-dioxolane, B.P. 160°–165° C.

The cis-trans-D(+), L(−) - 4 - di - lower alkylaminomethyl-2-lower alkyl-1,3-dioxolanes and their above-described equivalents can be used in the formulation of the products and in the practice of the method of this invention either in free-base form or in the form of non-toxic pharmaceutically acceptable salts, for example the hydrochloride, phosphate, sulfate, citrate, maleate and the like, such acid-addition salts being the full equivalents of the free bases from which they are derived in the formulation of products according to and in the practice of the method of the invention.

In accordance with the first product composition aspect of this invention, cis-trans-D(+), L(−)-4-dimethylaminomethyl-2-methyl-1,3-dioxolane, or one of its hereinabove described equivalents is formulated into a composition of matter comprising, in addition, phenacetin. The compositions of the invention, in its first product composition aspect, preferably should contain between 0.1 to 2.5 parts by weight of the 4-di-methylaminomethyl-2-methyl-1,3-dioxolane component for each part by weight of phenacetin.

In accordance with the second product composition aspect of this invention cis-trans-D(+), L(−)-4-dimethylaminomethyl-2-methyl-1,3-dioxolane, or one of its above described equivalents is formulated into a composition of matter comprising N-methyl-4-phenyl-4-carbethoxypiperidine, or equivalents thereof where a lower alkyl radical other than methyl is substituted at the nitrogen atom and/or a carbo-lower alkoxy radical other than carbethoxy is substituted at the 4-position and/or the phenyl radical at the 4-position bears one or more lower alkyl, lower alkoxy or halo substituents as well as non-toxic acid addition salts thereof. The compositions of this invention, in its second product composition aspect, preferably should contain between 2 and 40 parts by weight of the 4-dimethylaminomethyl-2-methyl-1,3-dioxolane component for each part by weight of the N-methyl-4-phenyl-4-carbethoxypiperidine component.

The compositions of the first and second product composition aspects of this invention possess marked pharmacological activity as analgesic agents, such activity being greater than that predictable from the analgesic activity of the individual constituents as determined by recognized and accepted pharmacological test procedures, set forth in detail hereinafter. Such compositions can also include other pharmacologically active components which are customarily used in analgesic formulations, such as caffeine, aspirin and mixtures thereof and can be combined with conventional pharmaceutical diluents and carriers to form such dosage forms as tablets, suspensions, solutions, suppositories and the like.

In accordance with the process of use aspect of this invention, cis-trans-D(+), L(−)-4-dimethylaminomethyl-2-methyl-1,3-dioxolane, or one of its above described equivalents, is administered to a mammal (including a human) in a non-toxic amount sufficient to induce a state of analgesia therein. In carrying out the method, the active ingredient is normally combined with conventional pharmaceutical diluents and carriers which are selected based upon the desired route of administration. The oral route is preferred due to ease of administration and subject acceptance. In carrying out the method, the substituted dioxolane can, if desired, be combined with phenacetin or N-methyl-4-phenyl-4-carbethoxypiperidine, or its above described equivalents, either alone or in combination wtih aspirin, caffeine or mixtures thereof, or with other therapeutically active compositions customarily included in analgesic formulations.

The individual unit dose and frequence of administration is determined not only by the nature and severity of the subject's pain for which induction of a state of analgesia is desired, but in addition upon the age, weight and species of the subject, its underlying physical condition and the route of administration. It will, accordingly, be within the professional judgment and skill of the practitioner administering the drug to determine the exact amount to be administered such as to be non-toxic, yet sufficient to induce a state of analgesia in the subject. For example, an effective dose in adult humans of cis, trans-D(+), L(−) - 4 - dimethylaminomethyl-2-methyl-1,3-dioxolane has been found to be in the range of about 200 to about 500 mg. per day administered orally in the relief of moderate pain.

The best mode contemplated by the inventor for carrying out this invention will now be set forth as follows:

The following example is a presentation of pharmacological data establishing the analgesic activity of cis-trans-D(+), L(−) - 4 - dimethylaminomethyl-2-methyl-1,3-dioxolane and its hereinabove disclosed equivalents.

*Example 1*

The following compound was prepared according to the method of U.S. Patent 2,445,393:

Compound No.:                      Compound name

1 -------- Cis-trans-D(+), L(−)-4-dimethylaminomethyl-2-methyl-1,3-dioxolane.

The following compounds are prepared according to the method outlined hereinabove for the preparation of pure isomers:

2 -------- Trans-D(+) - 4 - dimethylaminomethyl-2-methyl-1,3-dioxolane.

3 -------- Cis - L(−) - 4 - dimethylaminomethyl - 2 - methyl-1,3-dioxolane.

Acute toxicity determinations, in accordance with standard pharmacological test procedures, reveal the following:

| Compound No. | Route of Admin. | Animal | LD$_{50}$ |
| --- | --- | --- | --- |
| 1 | I.p. | Mouse | 400 |
| 1 | I.p. | Rat | 280 |
| 1 | Oral | Rat | 580 |
| 1 (as maleate salt) | I.p. | Rat | 330 |
| Do | Oral | Rat | 600 |
| 2 | I.p. | Mouse | 210 |
| 3 | I.p. | do | 170 |

The analgesic activity of these compounds was determined in accordance with a test which is a modification of the method described by Grewal (Brit. J. Pharmacol. & Chemotherap. 7:433 (1952)). Male white mice (Swiss strain CF–1), weighing between 18 and 22 grams, are randomly selected and housed, 10 mice to a cage. A Grass stimulator, adjusted to deliver one shock per second (square wave) for a duration of 0.1 sec. at 22.5 volts is used to stimulate the tail of the mouse. The base of the mouse's tail is prepared for stimulation by first cleansing with ether and then applying an electrode paste. The electrodes are then placed upon the tail and the number of shocks required to produce vocalization (squeak) is recorded. Each mouse acts as its own control during two control stimulating periods carried out 15 minutes apart. Only those mice which vocalize after receiving between 2 and 5 electrical shocks are selected for the test. A period of 30 minutes is allowed to elapse between the last control stimulation and administration of the drug. The animals are stimulated at intervals of 15, 30, 60, 90, 120, 150 and 180 minutes after drug administration. Analgesia is judged to have occurred when the number of stimuli (electric shocks) exceeds the control number of stimuli by more than 2. An E value is obtained by counting the number of stimuli that are significant, the third stimulus after the control number being the first significant number. If the number of stimuli applied after the application of the control number of stimuli plus 2 reaches 10 without evoking a response, stimulation is discontinued. Thus, the maximum possible E value is 10. A "total analgesia" (TA) value is obtained by multiplying the sum of the E values for each mouse by the number of mice protected (that is, the number of mice showing an E value of at least 1). With the test group of 10 mice, a maximum score would be the summation of 10 E values of 10 (100) multiplied by 10 (the number of mice protected) or a total of 1000.

The test drugs are administered in aqueous solution if water-soluble and when not water-soluble, as an aqueous suspension with gum tragacanth.

When the drug is administered intraperitoneally (i.p.) the animal is permitted food ad libitum both before and during the test period. When the drug is to be administered orally, the animals are fasted from 6 to 12 hours to insure emptying of the gastrointestinal tract.

The results of the evaluation are tabulated below:

| Compound No. | Route of Admin. | Dose (mg./kg.) | Total Analgesia (TA), Time in Minutes | | | |
|---|---|---|---|---|---|---|
| | | | 15 | 30 | 60 | 90 |
| 1 | I.p. | 26.5 | 136 | 2 | 0 | 0 |
| 1 | I.p. | 50 | 200 | 50 | 10 | 0 |
| 1 | I.p. | 100 | 500 | 300 | 100 | 0 |
| 1 [1] | I.p. | 100 | 600 | 250 | 75 | 20 |
| 1 | Oral | 50 | 240 | 40 | 0 | 0 |
| 2 | I.p. | 26.5 | 580 | 140 | 0 | 0 |
| 3 | I.p. | 26.5 | 920 | 499 | 53 | 1 |

[1] As maleate salt.

These data establish the effectiveness of cis-trans-D(+), L(−) - 4 - dimethylaminomethyl-2-methyl-1,3-dioxolane and its hereinabove described equivalents in inducing a state of analgesia in mammals at non-toxic doses in accordance with the invention sought to be patented in its process of use aspect.

That the foregoing test procedure is a valid means of determining the activity of a potent analgesic agent is established by the fact that it shows morphine sulfate to be active. For example, a test of morphine sulfate at a dose of 10 mg./kg. i.p. shows a TA value of 266 at 15 minutes and 130 at 30 minutes.

Example 2

Combine the following ingredients and fill into capsules, each capsule containing:

| | Mg. |
|---|---|
| Cis - trans - D(+),L(−)-4-dimethylaminomethyl-2-methyl-1,3-dioxolane maleate | 25 |
| Lactose | 470 |
| Magnesium stearate | 5 |
| | 500 |

Example 3

Combine the following ingredients and fill into capsules, each capsule containing:

| | Mg. |
|---|---|
| Cis - trans - D(+),L(−)-4-dimethylaminomethyl-2-methyl-1,3-dioxolane maleate | 100 |
| Lactose | 395 |
| Magnesium stearate | 5 |
| | 500 |

The following example presents the results of the evaluation of compositions comprising a 4-dimethylaminomethyl-2-methyl-1,3-dioxolane and phenacetin in accordance with the first product composition aspect of this invention:

Example 4

By use of the test procedure for determining the pharmacological activity of a substance as an analgesic agent described in Example 1, the compound cis-trans-D(+), L(−)-4-dimethylaminomethyl-2-methyl - 1,3 - dioxolane maleate was studied alone and in combination with phenacetin, phenacetin and aspirin, phenacetin and caffeine, and phenacetin, aspirin and caffeine. The following table presents the results of the evaluation, including data for phenacetin, caffeine, aspirin and a combination of the three. Throughout the tabulation, the compound cis-trans-D(+),L(−)-4-dimethylaminomethyl - 2 - methyl-1,3-dioxolane maleate is referred to by the notation "Test Cmpnd.". In the test, all formulations were administered i.p.

| Formulation No. | Composition | Dosage (mg./kg.) | Total Analgesia (TA), Time in Minutes | | | | | |
|---|---|---|---|---|---|---|---|---|
| | | | 15 | 30 | 60 | 90 | 120 | 180 |
| 1 | Test Cmpnd | 100 | 600 | 250 | 75 | 0 | 0 | 0 |
| 2 | Phenacetin | 160 | 0 | 0 | 0 | 0 | 0 | 0 |
| 3 | Aspirin | 225 | 0 | 0 | 0 | 0 | 0 | 0 |
| 4 | Caffeine | 30 | 0 | 0 | 0 | 0 | 0 | 0 |
| 5 | Phenacetin / Aspirin / Caffeine | 160 / 225 / 30 | 25 | 10 | 0 | 0 | 0 | 0 |
| 6 | Test Cmpnd / Phenacetin | 100 / 160 | 875 | 370 | 100 | 30 | 0 | 0 |
| 7 | Test Cmpnd / Phenacetin / Aspirin | 100 / 160 / 225 | 900 | 680 | 250 | 70 | 0 | 0 |
| 8 | Test Cmpnd / Phenacetin / Caffeine | 100 / 160 / 30 | 875 | 530 | 180 | 30 | 0 | 0 |
| 9 | Test Cmpnd / Phenacetin / Aspirin / Caffeine | 100 / 160 / 225 / 30 | 1,000 | 700 | 400 | 200 | 100 | 0 |

The following examples illustrate the formulation of typical dosage unit forms for oral administration which are administrable to mammals in accordance with the process of use aspect of this invention:

The data establish an unexpected superiority of analgesic activity when the Test Cmpnd. is combined with phenacetin, either with or without the presence of the additional ingredients aspirin and caffeine which are frequently present in analgesic formulation. The TA values for phenacetin, aspirin and caffeine are all 0 and those for the combination of phenacetin with aspirin and caffeine are extremely small. The TA values for the combination formulations 6 through 9 are significantly higher than those predictable by adding the respective TA values for the individual components, thus demonstrating that compositions of matter falling within the scope of the first product composition aspect of this invention exhibit an unexpected synergism in analgesic activity when evaluated by a recognized pharmacological test procedure.

The following examples illustrate the formulation of dosage units for oral administration comprising cis-trans-D(+),L(−)-4 - dimethylaminomethyl - 2 - methyl - 1,3-dioxolane and phenacetin. Such formulations represent examples of compositions falling within the product composition aspect of this invention and in addition are administrable to mammals in accordance with the process of use aspect of the invention.

*Example 5*

Combine the following ingredients and fill into capsules, each capsule containing:

| | Mg. |
|---|---|
| Cis-trans-D(+),L(−)-4 - dimethylaminomethyl - 2-methyl-1,3-dioxolane maleate | 25 |
| Phenacetin | 160 |
| Silica | 109 |
| Lactose | 60 |
| Starch | 15 |
| Magnesium stearate | 6 |
| | 375 |

*Example 6*

Combine the following ingredients and fill into capsules, each capsule containing:

| | Mg. |
|---|---|
| Cis-trans-D(+),L(−)-4 - dimethylaminomethyl - 2-methyl-1,3-dioxolane maleate | 100 |
| Phenacetin | 160 |
| Silica | 109 |
| Lactose | 60 |
| Starch | 15 |
| Magnesium stearate | 6 |
| | 450 |

*Example 7*

Combine the following ingredients and fill into capsules, each capsule containing:

| | Mg. |
|---|---|
| Cis-trans-D(+),L(−)-4 - dimethylaminomethyl - 2-methyl-1,3-dioxolane maleate | 50 |
| Phenacetin | 160 |
| Aspirin | 225 |
| Caffeine | 30 |
| Silica | 84 |
| Lactose | 60 |
| Starch | 15 |
| Magnesium stearate | 6 |
| | 630 |

The following example presents the results of the evaluation of compositions comprising a 4-dimethylaminomethyl-2-methyl-1,3-dioxolane and N-methyl-4-phenyl-4 - carbethoxy-piperidine in accordance with the second product composition aspect of this invention:

*Example 8*

By use of the test procedure for determining the pharmacological activity of a substance as an analgesic agent described in Example 1, the compounds cis-trans-D(+), L(−)-4-dimethylaminomethyl-2-methyl - 1,3 - dioxolane (referred to as "Compound A") and N-methyl-4-phenyl-4-carbethoxypiperidine hydrochloride (referred to as "Compound B") and a mixture of the two were studied, the results being set forth below. In the test, all formulations were administered orally.

| Formulation No. | Composition | Dosage (mg./kg.) | Total Analgesia (TA), Time in Minutes | | | |
|---|---|---|---|---|---|---|
| | | | 15 | 30 | 60 | 90 |
| 1 | Compound A | 50 | 240 | 40 | 0 | 0 |
| 2 | Compound B | 5 | 12 | 10 | 10 | 0 |
| 3 | {Compound A, Compound B} | {50, 5} | 680 | 320 | 30 | 0 |

The above data clearly establish an unexpected superiority of analgesic activity for the combination of Compounds A and B as compared to the activity of each individually when evaluated by a recognized pharmacological test procedure and establish that compositions of matter in accordance with the second product composition aspect of this invention exhibit synergism in analgesic activity.

The following example is illustrative of the formulation of a dosage unit for oral administration comprising a 4-dimethylaminomethyl-2-methyl-1,3-dioxolane and N-methyl-4-phenyl-4-carbethoxypiperidine:

*Example 9*

Combine the following ingredients and fill into capsules, each capsule containing:

| | Mg. |
|---|---|
| Cis - trans - D(+),L(−)-4-dimethylaminomethyl-2-methyl-1,3-dioxolane | 50 |
| N - methyl-4-phenyl-4-carbethoxypiperidine hydrochloride | 5 |
| Silica | 109 |
| Lactose | 60 |
| Starch | 15 |
| Magnesium stearate | 6 |
| | 245 |

*Example 10*

The following compounds, wherein the 2-position of the 1,3-dioxolane nucleus is disubstituted, were prepared according to the method of U.S. Patent 2,445,393:

| Compound No.: | Compound name |
|---|---|
| 4 | 4-piperidinomethyl-2,2-diphenyl-1,3-dioxolane. |
| 5 | 4-morpholinomethyl-2,2-dimethyl-1,3-dioxolane. |

By use of the test procedure described in Example 1 for determining the pharmacological activity of a substance as an analgesic agent, these two compounds were examined and found to possess analgesic activity as follows:

| Compound No. | Route of Admin. | LD$_{50}$ | Dose, mg./kg. | Total Analgesia (TA), Time in Minutes | | | |
|---|---|---|---|---|---|---|---|
| | | | | 15 | 30 | 60 | 90 |
| 4 | I.p. | >800 | 250 | | 250 | 60 | 40 |
| 5 | I.p. | 760 | 250 | | 40 | 120 | 30 |

These data establish the effectiveness of the 2-disubstituted-1,3-dioxolanes in inducing a state of analgesia in mammals at non-toxic doses.

The following examples are illustrative of the formulation of a dosage unit for oral administration comprising 4-dimethylamino-methyl-2-methyl-1,3-dioxolane in pure isomeric form.

Example 11

Combine the following ingredients and fill into capsules, each capsule containing:

|  | Mg. |
|---|---|
| Trans - D(+)-4-dimethylaminomethyl-2-methyl-1,3-dioxolane maleate | 27 |
| Lactose | 423 |
|  | 450 |

Example 12

Combine the following ingredients and fill into capsules, each capsule containing:

|  | Mg. |
|---|---|
| Cis - L(−)-4-dimethylaminomethyl-2-methyl-1,3-dioxolane maleate | 27 |
| Lactose | 423 |
|  | 450 |

The subject matter which the applicant regards as his invention is particularly pointed out and distinctly claimed as follows—

I claim:

1. A method of effecting analgesia in mammals which comprises the administration to a mammal suffering from pain of a non-toxic amount of 4-dimethylamino-2-lower alkyl-1,3-dioxolane sufficient to induce a state of analgesia therein.

2. A method according to claim 1 wherein the route of administration is oral.

3. A method according to claim 1 wherein the route of administration is parenteral.

4. A method according to claim 1 wherein said 4-dimethylamino-2-lower alkyl-1,3-dioxolane is trans-D(+)-4-dimethylaminomethyl-2-methyl-1,3-dioxolane.

5. A method according to claim 1 wherein said 4-dimethylamino-2-lower alkyl-1,3-dioxolane is cis-L(−)-4-dimethylaminomethyl-2-methyl-1,3-dioxolane.

References Cited

UNITED STATES PATENTS 2,445,393   7/1948   Fourneau _____ 260—340.9

ALBERT T. MEYERS, *Primary Examiner.*

SAM ROSEN, *Examiner.*

S. J. FRIEDMAN, *Assistant Examiner.*